United States Patent
Burezq et al.

(10) Patent No.: US 10,995,271 B1
(45) Date of Patent: May 4, 2021

(54) BIOORGANIC SOIL CONDITIONER

(71) Applicant: KUWAIT INSTITUTE FOR SCIENTIFIC RESEARCH, Safat (KW)

(72) Inventors: Hana'a Adel Burezq, Meshref (KW); Shawqui M. Lahalih, Safat (KW)

(73) Assignee: KUWAIT INSTITUTE FOR SCIENTIFIC RESEARCH, Safat (KW)

( * ) Notice: Subject to any disclaimer, the term of this patent is extended or adjusted under 35 U.S.C. 154(b) by 0 days.

(21) Appl. No.: 16/931,011

(22) Filed: Jul. 16, 2020

(51) Int. Cl.
*C09K 17/32* (2006.01)
*A01C 23/04* (2006.01)
*C05G 3/80* (2020.01)
*C09K 101/00* (2006.01)

(52) U.S. Cl.
CPC .............. *C09K 17/32* (2013.01); *A01C 23/04* (2013.01); *C05G 3/80* (2020.02); *C09K 2101/00* (2013.01)

(58) Field of Classification Search
CPC ...... C09K 17/32; C09K 2101/00; C05G 3/80; A01C 23/04
See application file for complete search history.

(56) References Cited

U.S. PATENT DOCUMENTS

| | | |
|---|---|---|
| 4,677,159 A | 6/1987 | Lahalih et al. |
| 4,793,741 A | 12/1988 | Lahalih et al. |
| 4,839,095 A | 6/1989 | Lahalih et al. |
| 4,898,908 A | 2/1990 | Lahalih et al. |
| 5,670,567 A | 9/1997 | Lahalih |
| 5,824,725 A | 10/1998 | Lahalih |
| 2009/0308122 A1 | 12/2009 | Shah |
| 2013/0005578 A1* | 1/2013 | Bergstrom ............. A01N 25/04 504/358 |
| 2013/0123103 A1* | 5/2013 | Anderson ............. C09K 17/40 504/102 |
| 2014/0030250 A1* | 1/2014 | Eddy .................... B01J 20/2803 424/125 |
| 2017/0066696 A1 | 3/2017 | Appel et al. |
| 2019/0106637 A1 | 4/2019 | Oswald et al. |

FOREIGN PATENT DOCUMENTS

| | | |
|---|---|---|
| CN | 105706601 A | 6/2016 |
| CN | 107384411 A | 11/2017 |
| CN | 107721651 A | 2/2018 |
| CN | 108586123 A | 9/2018 |
| CN | 108821284 A | 11/2018 |
| CN | 109734180 A | 5/2019 |
| CN | 110140465 A | 8/2019 |
| CN | 110156500 A | 8/2019 |
| EP | 3313953 B1 | 7/2019 |

OTHER PUBLICATIONS

"Standardized Product Definition and Product Testing Guidelines for Biochar That is Used in Soil", International Biochar Initiative (2015), 61 pages.

Berezq, H., "Intensification of Alfaifa (*Medicago sativa* L.) Forage Production Using Biochar, Animal Manure and Specialty Chemicals—Case of Kuwait", European Journal of Scientific Research (2019), vol. 154, No. 2, pp. 254-268.

* cited by examiner

*Primary Examiner* — Jennifer A Smith
(74) *Attorney, Agent, or Firm* — Nath, Goldberg & Meyer; Richard C. Litman

(57) ABSTRACT

The bioorganic soil conditioner includes biochar derived from plant waste and a mix of chemicals including sulfonated naphthalene formaldehyde, urea-formaldehyde and polyvinyl alcohol. The bioorganic soil conditioner is made by infusing biochar from lignin-rich plant waste with the mix of chemicals. The bioorganic soil conditioner improves soil aggregation and moisture and nutrient retention capacity. Thus, the bioorganic soil conditioner may be added to soil to improve crop production and stabilize soil, for example, in conditions of high wind or desertification.

6 Claims, No Drawings

BIOORGANIC SOIL CONDITIONER

BACKGROUND

1. Field

The disclosure of the present patent application relates to soil conditioners, and particularly to a bioorganic soil conditioner.

2. Description of the Related Art

Organic materials, such as wastes and residues generated in urban landscapes and agricultural farms, are typically discarded in ways that occupy prime arable land, increase greenhouse gas emissions or pollute groundwater through leaching toxic compounds. Many strategies have been devised to transform or otherwise utilize such materials to reduce such harmful effects. In particular, cellulose-rich plant materials are generally recycled to compost, whose impact in soil under hot conditions diminishes within a maximum of six months. Lignin-rich plant materials are not easily composted and are typically disposed of as waste.

Biochar is a carbon-rich material derived from biomass through pyrolysis, which is a process of applying high temperature and a depleted oxygen environment to remove water and volatile compounds from the biomass. Biochar is sterile, porous and rich in stable carbon, but does not particularly benefit crops nutritionally when added to soil alone.

Soil for crop growth and farming may be negatively impacted by weather, particularly soil with high sand content, as may be increasingly the case in areas undergoing desertification (i.e., the process by which fertile land becomes desert, typically as a result of drought, deforestation, or inappropriate agriculture). Existing strategies of soil stabilization include mechanical or chemical strategies. Mechanical strategies, including building barriers and sand fences or planting trees, are costly and take significant time to implement. Chemical strategies involve expensive chemicals with potentially toxic or disadvantageous side effects and short term efficacy.

Plant productivity, crop yield, and soil health are directly related to each other. An organic carbon-deficient soil cannot produce optimal crops and plants. Soil fertility can be enhanced/improved by improving the soil's physical, chemical, and biological properties.

Thus, a bioorganic soil conditioner solving the aforementioned problems is desired.

SUMMARY

The bioorganic soil conditioner is composed of biochar and a mixture of chemicals, the chemicals including a naphthalene-based superplasticizer, a urea-formaldehyde product, and an alcohol-based binder. The naphthalene-based superplasticizer may be a sodium salt of a naphthalene sulfonate condensed with formaldehyde (SNF), the urea-formaldehyde product may be a urea-formaldehyde condensate (UF), and the alcohol-based binder may be polyvinyl alcohol (PVA).

The biochar may be derived from lignin-rich plant materials, and particularly the woody parts of plants, such as branches, stems, roots, etc. In particular, the biochar may be derived from tree waste with the leaves substantially removed.

The process of making the bioorganic soil conditioner may include making biochar through pyrolysis of plant waste, and infusing the biochar with a naphthalene-based superplasticizer, a urea-formaldehyde product and an alcohol-based binder.

Soil may be stabilized and crop output increased by applying the above bioorganic soil conditioner to the soil. The soil may be sandy soil or the crop may be located in an area of desertification. The bioorganic soil conditioner improves soil aggregaton, water holding capacity, and nutrient retention capacity. The bioorganic soil conditioner may be combined with an agricultural nutrient source, such as manure or compost, before application to the soil.

These and other features of the present disclosure will become readily apparent upon further review of the following specification.

DETAILED DESCRIPTION OF THE PREFERRED EMBODIMENTS

The bioorganic soil conditioner is a composition including biochar and a mixture of chemicals, the chemicals including a naphthalene-based superplasticizer, a urea-formaldehyde product, and an alcohol-based binder. The naphthalene-based superplasticizer may be a sodium salt of a naphthalene sulfonate condensed with formaldehyde (SNF), the urea-formaldehyde product may be a urea-formaldehyde condensate (UF), and the alcohol-based binder may be polyvinyl alcohol (PVA). The naphthalene-based superplasticizer, the urea-formaldehyde product, and the binder may be present in the bioorganic soil conditioner in amounts of 1.456 kg, 3.604 kg, and 0.104 kg per 40 kg biochar, respectively.

The biochar may be derived from lignin-rich plant materials, and particularly the woody parts of plants, such as branches, stems and roots. In particular, the biochar may be derived from tree waste with the leaves substantially removed.

The process of making the bioorganic soil conditioner may include making biochar through pyrolysis of plant waste and infusing the biochar with a naphthalene-based superplasticizer, a urea-formaldehyde product, and an alcohol-based binder.

In particular, the process may include steps of acquiring a biochar, for example, by subjecting a plant biomass to high temperatures in a depleted oxygen atmosphere, where high temperatures are at least the thermal decomposition temperature of the plant biomass.

Soil may be stabilized crop output may be increased by applying the above bioorganic soil conditioner to the soil. The soil may be sandy soil or the crop may be located in an area of desertification. The bioorganic soil conditioner may be combined with an agricultural nutrient source, such as manure or compost, before applying to the soil. The method of stabilizing soil may be combined with any known method of stabilizing soil, such as adding chemical/organic stabilizers, building fences or sand walls, or planting trees.

"Biochar" is defined as carbon rich material resulting from pyrolysis of biomass. "Pyrolysis" is defined herein as a process of decomposing matter by application of high temperature in a depleted oxygen environment sufficient to remove volatile compounds and moisture from the matter. The temperature should be at least the thermal decomposition temperature of the material. "Biomass" is any biologically based material, such as plant matter or animal matter. As referred to in the following examples, "the biomass" refers to the biomass used in the exemplary implementations of the present subject matter, namely, the lignin-rich plant material derived from trees parts with leaves significantly removed. One skilled in the art would understand that pyrolysis of various initial biomass compositions may produce biochar with different chemical or physical properties or require different temperatures during the production of biochar.

Biochar produced from different plant based residues, for example, do not present significant differences in stable carbon content, which is the dominant component of biochar in the bioorganic soil conditioner. The biochar is not intended as a significant source of nutrients in the bioorganic soil conditioner. Biochar can be prepared based on the availability of other biomass sources, such as poultry and animal manure. However, biochar preparation based on lignin-rich biomass requires relatively high temperatures during pyrolysis. In addition, biochar prepared from animal and poultry manure may present different compositions and physical and chemical properties that would require different amounts of chemicals for infusion.

Naphthalene-based superplasticizers may be sulfonated salts of polycondensates of naphthalene and formaldehyde, commonly known as polynaphthalene sulfonates or naphthalene-based superplasticizers, and particularly may be the sodium salt of a naphthalene sulfonate condensed or polymerized with formaldehyde (SNF).

The urea-formaldehyde product may be a urea-formaldehyde condensate (UF) (i.e., the product of a condensation reaction between urea and formaldehyde), and may take the form of a resin or polymer.

The alcohol-based binder is preferably water soluble, non-toxic and agriculturally acceptable. In particular, the alcohol-based binder may be polyvinyl alcohol (PVA). PVA is a water-soluble synthetic polymer having the general formula $[CH_2CH(OH)]_n$.

Generally, sandy soils have a gritty texture and are formed significantly from weathered rocks such as limestone, quartz, granite, and shale. Sandy soils are prone to overdraining and dehydration, and can have problems retaining moisture and nutrients and are particularly vulnerable to erosion by, for example, wind.

The bioorganic soil conditioner can be applied to any type of soil, including black cotton soil, saline soil, medium to high saline soil, yellow soil, sandy soil, loamy soil, alluvial soil (delta soil), lava soil, top soil and subsoil that can be used in crop/plant production. The bioorganic soil conditioner can be applied to soil for crops including fruits, nuts, citrus, watermelons, tomatoes, peppers, cucumbers, row crops, such as cotton, corn and wheat, as well as other edible, commercial, perennial, horticulture and ornamental crops. In the following examples, alfalfa is used as an exemplary crop.

The term "plant growth regulator" refers to any material of natural or synthetic origin that is applied to soils or to plant tissues to supply one or more plant nutrients essential to the growth of plants.

The term "market fertilizer" refers to any material which is generally used as a fertilizer and is commercially available, such as NPK, DAP (Diammonium phosphate) and MOP (Muriate of potash).

A "soil conditioner" is a mixture of substances or a blend that can be added directly to soil to improve soil characteristics, or can be added to an agricultural or fertilizer composition, which, in turn, is added to a soil to assist in growth and maintenance of plants.

It should be understood that the amounts of materials for the methods described herein are exemplary, and appropriate scaling of the amounts is contemplated, so long as the relative ratio of materials is maintained.

The following examples illustrate the present teachings.

Example 1

Synthesis of Exemplary Bioorganic Soil Conditioner

Biochar was prepared for the exemplary bioorganic soil conditioner from plant based residue received from PAAFR (the Public Authority for Agriculture Affairs and Fish Resources, Kuwait) (urban landscape cutting of trees). Only the hard parts of the plant-based residue (i.e., high lignin content) were used to prepare the biochar through pyrolysis. Leaves were not used for the biochar, but were separately composted. The plant-based residue collected was shredded, ground, and transformed into pellets, and then added into a biochar machine. The biochar machine was operated using electricity, and the biochar prepared at a temperature of 650° C. in a reduced oxygen environment. The biochar machine used had the capacity to prepare 60 kg biochar per 7 hours.

The exemplary bioorganic soil conditioner was synthesized by infusing the biochar with a mix solution of SNF as the exemplary naphthalene-based superplasticizer, UF as the exemplary urea-formaldehyde product, and PVA as the exemplary alcohol-based binder. In the exemplary synthesis and experiments described herein, the SNF was in powdered form (WEIFANG ENTACHEM CO., Cas. No. 36290-04-7), the UF ($C_2H_6N_2O_2$) was in liquid form, 85% pure (specific gravity 1.325 g/ml, Chemikuwait), and the PVA was in powdered form as fully hydrolized (Merck KGaA; CAS-No: 9002-89-5). To infuse 40 kg of biochar with the SNF, UF and PVA, a PVA solution was prepared by dissolving 0.104 kg in 10.4 L of water, and an SNF solution was prepared by dissolving 1.456 kg in 14.56 L of water. The PVA solution and the SNF solution were mixed with 3.2 L UF (effectively 3.604 kg UF in solution) to form a chemical mixture. The 40 kg of biochar was added to a rotating mixer, and the mixer was rotated at 100 revolutions per minute (rpm). The chemical mixture was sprayed as an aerosol on the biochar under mixing conditions in the rotating mixer using a sprayer until the chemical mixture was completely incorporated into the biochar, i.e., 15 minutes, resulting in the exemplary bioorganic soil conditioner.

The final composition of the exemplary bioorganic soil conditioner is provided in Table 1:

TABLE 1

| Composition of bioorganic soil conditioner | | |
|---|---|---|
| Constituents | Quantity (kg) | % |
| Biochar | 40.000 | 88.566 |
| PVA | 0.104 | 0.230 |
| SNF | 1.456 | 3.224 |
| UF | 3.604 | 7.980 |
| Total | 45.164 | 100.00 |

The bioorganic soil conditioner provided superior results compared to the control, where it was not applied. Two application methods of applying biochar and chemicals to the soil were tested under laboratory conditions using small test trays: (i) a biochar:manure mixture (1.5:1) was added to soil in a test tray, the resulting soil surface was sprayed with the chemicals, and then seeds were placed in the soil at 1 cm depth; and (ii) biochar was infused with the chemicals to produce the bioorganic soil conditioner as described above, and the bioorganic soil conditioner:manure (1.5:1) was added to soil in a test tray, followed by placing seeds in the soil at 1 cm depth. Condition (ii) resulted in higher seed germination than condition (i), indicating more effective soil conditioning is achieved by infusing the mixture of specialty chemicals into the biochar uniformly, rather than spraying the surface of the soil after addition of biochar only. A proportion of bioorganic soil conditioner:manure of 1.5:1 was found suitable and was tested in the following field trials, but it will be understood that the ratio of bioorganic soil conditioner to manure may be adjusted by routine experimentation depending upon the particular crop(s) being grown in the soil to be conditioned or the nature of the manure, fertilizer or other plant growth regulator to be added to the soil.

Soil samples taken from locations throughout Kuwait were analyzed for particle size distribution to confirm that soil at AL-Shegaya station, where the experiment was conducted, is representative of the soils of Kuwait at large. The analysis shows that AL-Shegaya soil is dominantly sandy with some gravel content, where sand and gravel are classified according to the Unified Soil Classification System. The soil moisture retention of soil mixed with the bioorganic soil conditioner was found to be 45%, compared to 3.5% for untreated soil, i.e., native soil of Kuwait.

Example 2

Effects of Exemplary Bioorganic Soil Conditioner on Crop Output

The bioorganic soil conditioner was tested for influence on crop output when applied. Alfalfa was used as an exemplary crop. Three different treatments for alfalfa production were applied according to the following treatment regiments. In treatment 1 (T-1), a nitrogen (N), phosphorus (P) and potassium (K) fertilizer (NPK) was applied to the soil at an amount of 0.25 kg/m$^2$. No other fertilizer or exemplary bioorganic soil conditioner was applied. In treatment 2 (T-2), the bioorganic soil conditioner was added at an amount of 5.645 kg/m$^2$, NPK was added at an amount of 0.25 kg/m$^2$, and animal manure at an amount of 3.2 kg/m$^2$. In treatment 3 (T-3), NPK at an amount of 0.25 kg/m$^2$ and a mix of untreated biochar (5 kg/m$^2$) and animal manure (3.2 kg/m$^2$) were added, only. The difference in total weight between T-2 and T-3 is due to the weight of the specialty chemicals added in T-2. It should be understood that the bioorganic soil conditioner may be applied with any desired agricultural additives for a given crop. In each treatment, NPK, manure:untreated biochar, or manure:bioorganic soil conditioner were added to soil of trial plots by spreading uniformly and then using a cultivator to incorporate the test materials into the top 15 cm soil depth. Alfalfa seeds were then sown in the plots with a seeder and the crops were irrigated with desalinated water under a central pivot system. A 60% increase in fresh biomass production was achieved in condition T-2 relative to condition T-1 and a 15% increase in fresh biomass production was achieved in condition T-2 relative to condition T-3.

Example 3

Effects of Exemplary Bioorganic Soil Conditioner on Soil Erosion

A wind erosion test was conducted in a wind tunnel at three wind speeds: 5, 10 and 15 m/s. Soil prepared according to the following conditions: T-1' (6 kg soil, only), T-2' (6 kg soil, bioorganic soil conditioner prepared according to the above methods and the amounts in Table 2, 300 g manure) and T-3' (450 g biochar, 300 g manure).

TABLE 2

Amounts used to prepare bioorganic soil conditioner for wind erosion trial

| Ingredients | Quantity |
| --- | --- |
| Biochar | 450 g |
| PVA | 1.25 g dissolved in 125 ml = 1 wt. % |
| SNF | 16.2 g dissolved in 162 ml = 10 wt. % |
| UF | 36 ml (40.545 g) |

Soil was mixed with the above ingredients at the respective amounts and placed in test trays.

Each soil for each treatment condition was exposed to 3 wind speeds of 5, 10, 15 m/s for 3 hours. The loss of soil in each treatment condition was recorded and taken as a measure of soil erosion. At a 5 m/s wind speed, soil erosion (mass loss following wind exposure) for T-2' was 35% that of T-1' and 59% that of T-3'. At a 10 m/s wind speed, soil erosion (mass loss following wind exposure) for T-2' was 55% that of T-1' and 65% that of T-3'. At a 15 m/s wind speed, soil erosion (mass loss following wind exposure) for T-2' was 58% that of T-1' and 72% that of T-3'. For context, the average wind speed of Kuwait is around 8 m/s. Thus, the present bioorganic soil conditioner is demonstrably protective against a significant amount of soil erosion, even in high-wind conditions (15 m/s). The bioorganic soil conditioner effectively stabilizes soils in typical and extreme conditions relative to biochar alone or no treatment.

The bioorganic soil conditioner stabilizes soil, improves the structure of sandy soil, and increases cationic exchange capacity (CEC) of soil, which increases capacity of the soil to hold nutrients and moisture. The improvement of soil health increases the crop production. The use of bioorganic soil conditioner may, in particular, bind the soil particles of sandy soil to control soil erosion. The bioorganic soil conditioner may additionally increase $CO_2$ sequestration.

The bioorganic soil conditioner minimizes organic residues (plant, animal and poultry wastes) by converting them to useful biochar combined with chemicals to form the bioorganic soil conditioner to decrease soil erosion and increase crop production. The bioorganic soil conditioner improves soil structure to increase soil moisture, nutrient retention, and cation exchange capacity, improving soil fertility, allowing for decreased fertilizer and water use for cost effective agriculture production.

It is to be understood that the bioorganic soil conditioner is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A bioorganic soil conditioner, consisting of, by weight:
    biochar at 88.566%; and
    a mixture of additives, wherein the additives consist of, by weight:
        a naphthalene-based superplasticizer, wherein the naphthalene-based superplasticizer is a sodium salt of naphthalene sulfonate condensed with formaldehyde (SNF), forming a polymer at 3.224%;

a urea-formaldehyde product, wherein the urea-formaldehyde product is a urea formaldehyde condensate (UF) at 7.980%; and a polyvinyl alcohol (PVA) binder at 0.230%.

2. A method of making the bioorganic soil conditioner of claim 1, comprising the steps of:

dissolving the naphthalene-based superplasticizer, the urea-formaldehyde product, and the polyvinyl alcohol binder in an aqueous carrier to form a mixture; and aerosolizing the mixture and spraying the biochar with the aerosolized mixture.

3. A bioorganic soil conditioner for increasing crop output, increasing water and nutrient retention in the soil, and reducing soil erosion, the composition consisting of:

a biochar; and a mixture of biochar-enhancing additives mixed with the biochar, the additives consisting of:

urea-formaldehyde concentrate;

naphthalene sulfonate formaldehyde; and polyvinyl alcohol.

4. A method of making the bioorganic soil conditioner according to claim 3, comprising the steps of:

subjecting the woody parts of trees, without stems or leaves, to pyrolysis in a depleted oxygen environment at 650° C. for 7 hours per 60 kg to thereby form biochar;

placing the biochar in a rotary mixer;

mixing aqueous solutions of the urea-formaldehyde concentrate and the polyvinyl alcohol with the urea formaldehyde to form an aqueous mixture; and spraying the aqueous mixture onto the biochar while rotating the mixer at 100 revolutions per minute to uniformly mix the biochar-enhancing additives with the biochar.

5. A method of conditioning soil using the bioorganic soil conditioner according to claim 3, comprising the steps of:

applying the bioorganic soil conditioner of claim 3 and animal manure to a surface of the soil at a rate of 1.5:1 conditioner to manure; and cultivating the soil to a depth of 15 cm to uniformly mix the conditioner and the manure with the soil.

6. The method of conditioning soil according to claim 5, further comprising the step of applying a nitrogen:phosphorous:potassium fertilizer to the soil.

* * * * *